(12) United States Patent
Duarte et al.

(10) Patent No.: US 10,375,223 B2
(45) Date of Patent: Aug. 6, 2019

(54) NOTIFYING A USER OF EVENTS IN A COMPUTING DEVICE

(75) Inventors: Matias Duarte, Sunnyvale, CA (US); Daniel Shiplacoff, Los Angeles, CA (US); Jeremy Lyon, Sunnyvale, CA (US); Paul Mercer, Palo Alto, CA (US); Richard R. Dellinger, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1309 days.

(21) Appl. No.: 12/200,782

(22) Filed: Aug. 28, 2008

(65) Prior Publication Data

US 2010/0058231 A1 Mar. 4, 2010

(51) Int. Cl.
*H04M 1/725* (2006.01)
*G06F 3/0481* (2013.01)

(52) U.S. Cl.
CPC ...... *H04M 1/72552* (2013.01); *G06F 3/0481* (2013.01); *G06F 2203/04803* (2013.01)

(58) Field of Classification Search
CPC ...... G06F 3/048; G06F 3/0481; G06F 3/0486; H04M 2250/22; H04M 1/72552
USPC ................ 715/790, 815, 788, 781, 841, 810
See application file for complete search history.

(56) References Cited

U.S. PATENT DOCUMENTS

| | | | |
|---|---|---|---|
| 5,559,942 A * | 9/1996 | Gough et al. | 715/802 |
| 5,625,827 A * | 4/1997 | Krause et al. | 715/234 |
| 6,226,630 B1 * | 5/2001 | Billmers | G06F 17/30613 |
| 6,597,378 B1 * | 7/2003 | Shiraishi et al. | 715/764 |
| 6,661,438 B1 * | 12/2003 | Shiraishi | G06F 1/1626 715/781 |
| 7,069,515 B1 | 6/2006 | Eagle et al. | |

(Continued)

FOREIGN PATENT DOCUMENTS

| | | |
|---|---|---|
| CN | 1591353 A | 3/2005 |
| CN | 1871838 A | 11/2006 |

(Continued)

*Primary Examiner* — Amy Ng
*Assistant Examiner* — William Wong
(74) *Attorney, Agent, or Firm* — Paradice and Li LLP

(57) ABSTRACT

In a computing device, event notifications take the form of alerts that can be presented in different ways. The particular form of each event notification depends on the nature of the event, the user task being performed at the time the event occurs, the user's preferences, or any combination thereof. In one aspect, the present invention presents event notifications in the form of banner alerts. Obtrusiveness is minimized by presenting the notification at a location near the edge of the screen (such as a bottom edge), and slightly shrinking the active display area to make room for the event notification. In this manner, event notifications can be presented without obscuring any part of the active display area. In addition, the user can obtain more information about the event by activating the notification (for example by tapping on it). In another aspect, the present invention provides a summary of pending event notifications. Thus, if the user is unable to (or does not wish to) respond to or acknowledge a notification when it is presented, the user can later view the event notification summary at his or her convenience, and can act on the event notifications at that time.

28 Claims, 11 Drawing Sheets

(56) References Cited

U.S. PATENT DOCUMENTS

| | | | |
|---|---|---|---|
| 7,221,331 B2* | 5/2007 | Bear et al. | 345/1.1 |
| 7,308,697 B1* | 12/2007 | Jerding | H04L 12/2801 348/E7.063 |
| 7,996,045 B1* | 8/2011 | Bauer | G06F 3/0488 455/466 |
| 8,311,513 B1* | 11/2012 | Nasserbakht | G06Q 10/109 455/410 |
| 2001/0021649 A1* | 9/2001 | Kinnunen et al. | 455/412 |
| 2002/0030271 A1* | 3/2002 | Stappers | 257/726 |
| 2002/0191029 A1 | 12/2002 | Gillespie et al. | |
| 2004/0189710 A1* | 9/2004 | Goulden et al. | 345/790 |
| 2005/0044500 A1* | 2/2005 | Orimoto et al. | 715/706 |
| 2005/0120306 A1* | 6/2005 | Klassen | G06F 3/04817 715/765 |
| 2005/0138575 A1* | 6/2005 | Hashimoto et al. | 715/815 |
| 2005/0213717 A1 | 9/2005 | O'Neil et al. | |
| 2005/0235220 A1* | 10/2005 | Duperrouzel et al. | 715/788 |
| 2006/0010394 A1 | 1/2006 | Chaudhri et al. | |
| 2006/0020904 A1* | 1/2006 | Aaltonen | G06F 3/048 715/850 |
| 2006/0119537 A1 | 6/2006 | Vong et al. | |
| 2006/0123353 A1 | 6/2006 | Matthews et al. | |
| 2007/0010273 A1* | 1/2007 | Thomas | H04W 72/005 455/519 |
| 2007/0010292 A1* | 1/2007 | Vetelainen et al. | 455/566 |
| 2007/0066283 A1* | 3/2007 | Haar et al. | 455/412.2 |
| 2007/0146347 A1* | 6/2007 | Rosenberg | 345/173 |
| 2007/0162871 A1 | 7/2007 | Ishii | |
| 2007/0195007 A1 | 8/2007 | Bear et al. | |
| 2007/0216760 A1 | 9/2007 | Kondo et al. | |
| 2007/0300183 A1* | 12/2007 | Anttila et al. | 715/808 |
| 2008/0122796 A1* | 5/2008 | Jobs et al. | 345/173 |
| 2008/0165145 A1 | 7/2008 | Herz et al. | |
| 2008/0266205 A1 | 10/2008 | Moehring et al. | |
| 2009/0177981 A1* | 7/2009 | Christie et al. | 715/758 |
| 2009/0210497 A1 | 8/2009 | Callanan et al. | |
| 2009/0247112 A1* | 10/2009 | Lundy et al. | 455/404.1 |
| 2009/0249247 A1* | 10/2009 | Tseng et al. | 715/808 |
| 2009/0293007 A1* | 11/2009 | Duarte et al. | 715/767 |
| 2017/0272564 A1 | 9/2017 | Duarte et al. | |

FOREIGN PATENT DOCUMENTS

| | | |
|---|---|---|
| CN | 1930871 A | 3/2007 |
| EP | 1659766 B1 | 2/2007 |
| KR | 100751936 | 8/2007 |
| WO | WO-2007089766 A2 | 8/2007 |
| WO | WO-2008030970 A3 | 3/2008 |
| WO | WO-2010024986 A2 | 3/2010 |

* cited by examiner

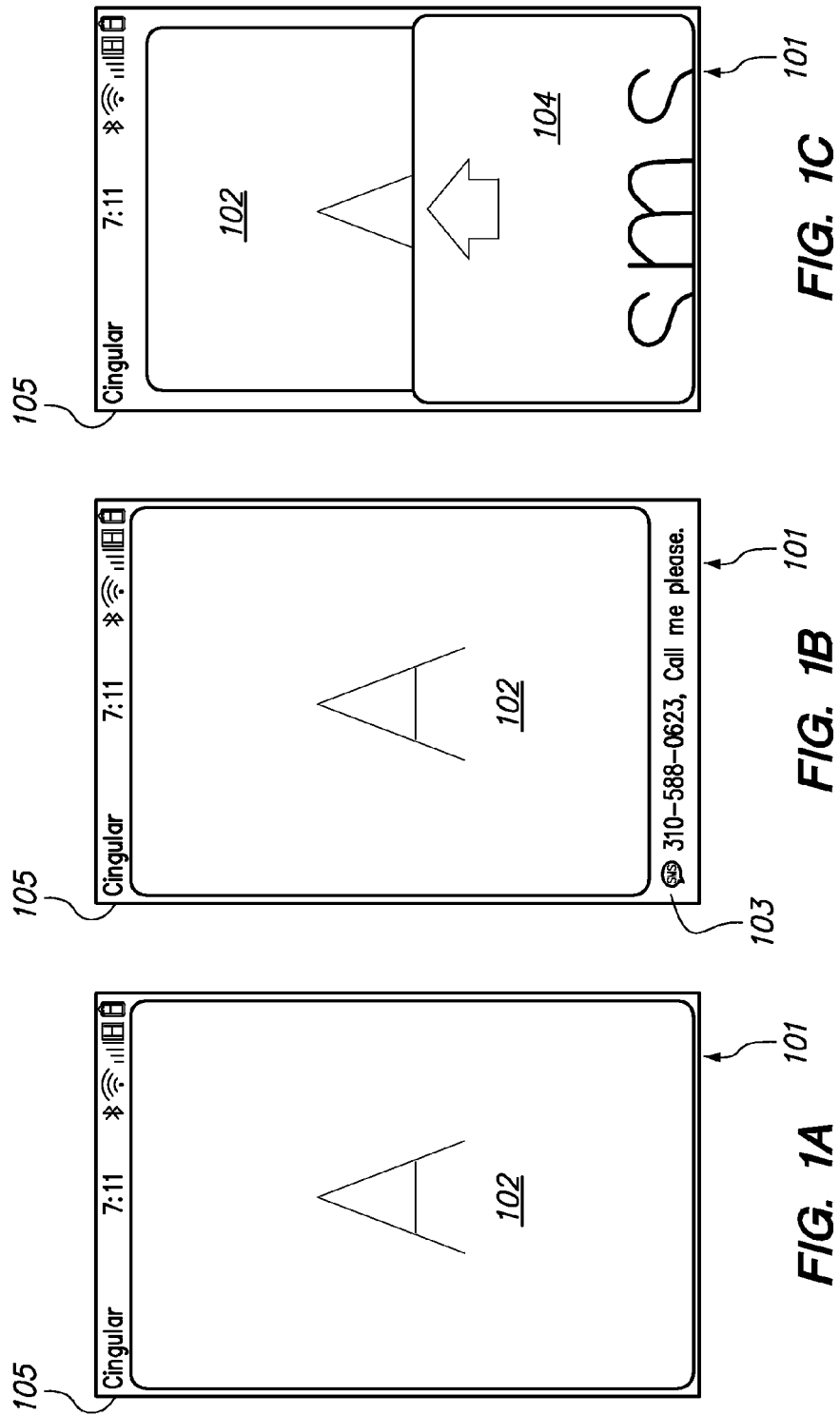

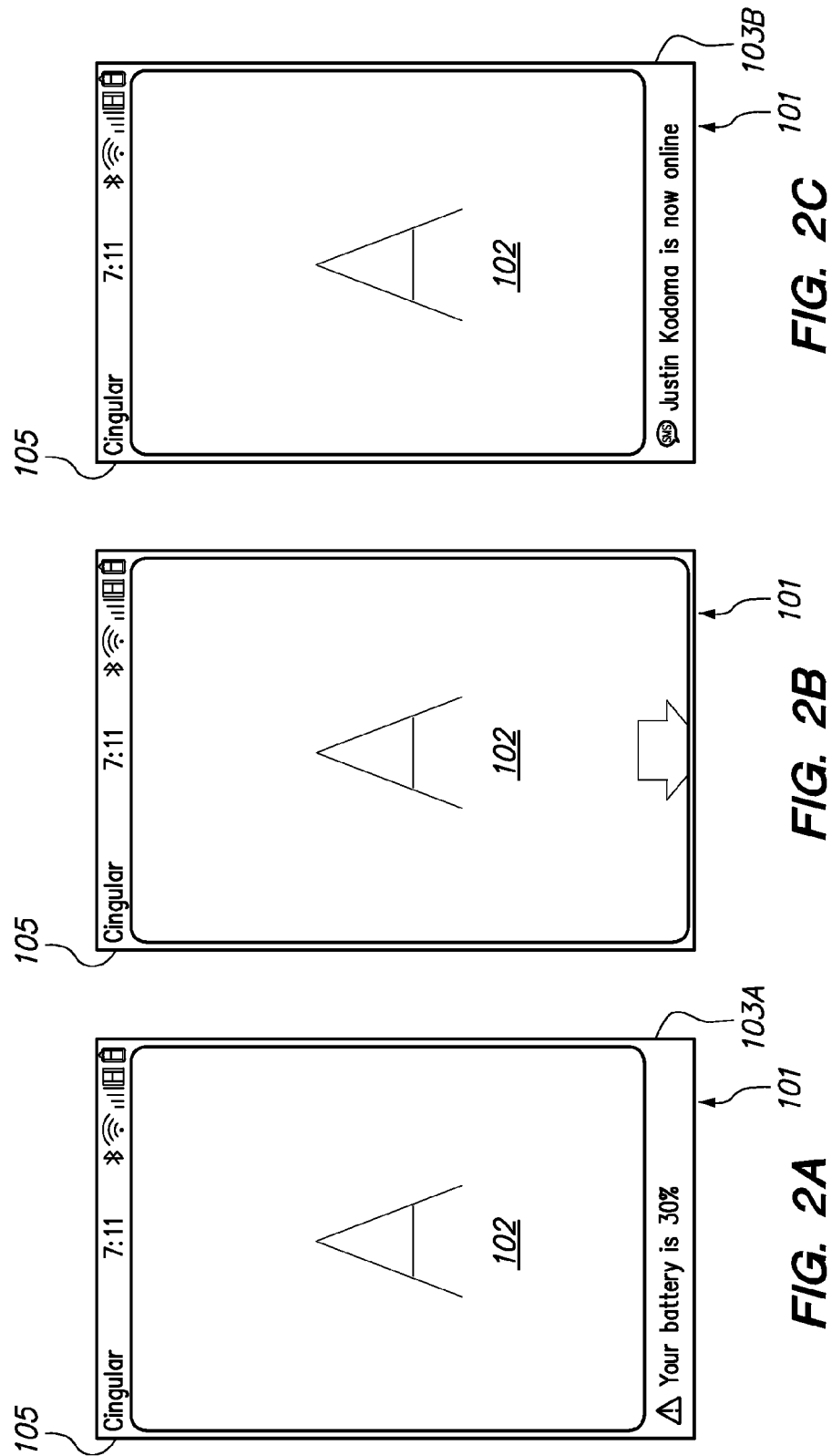

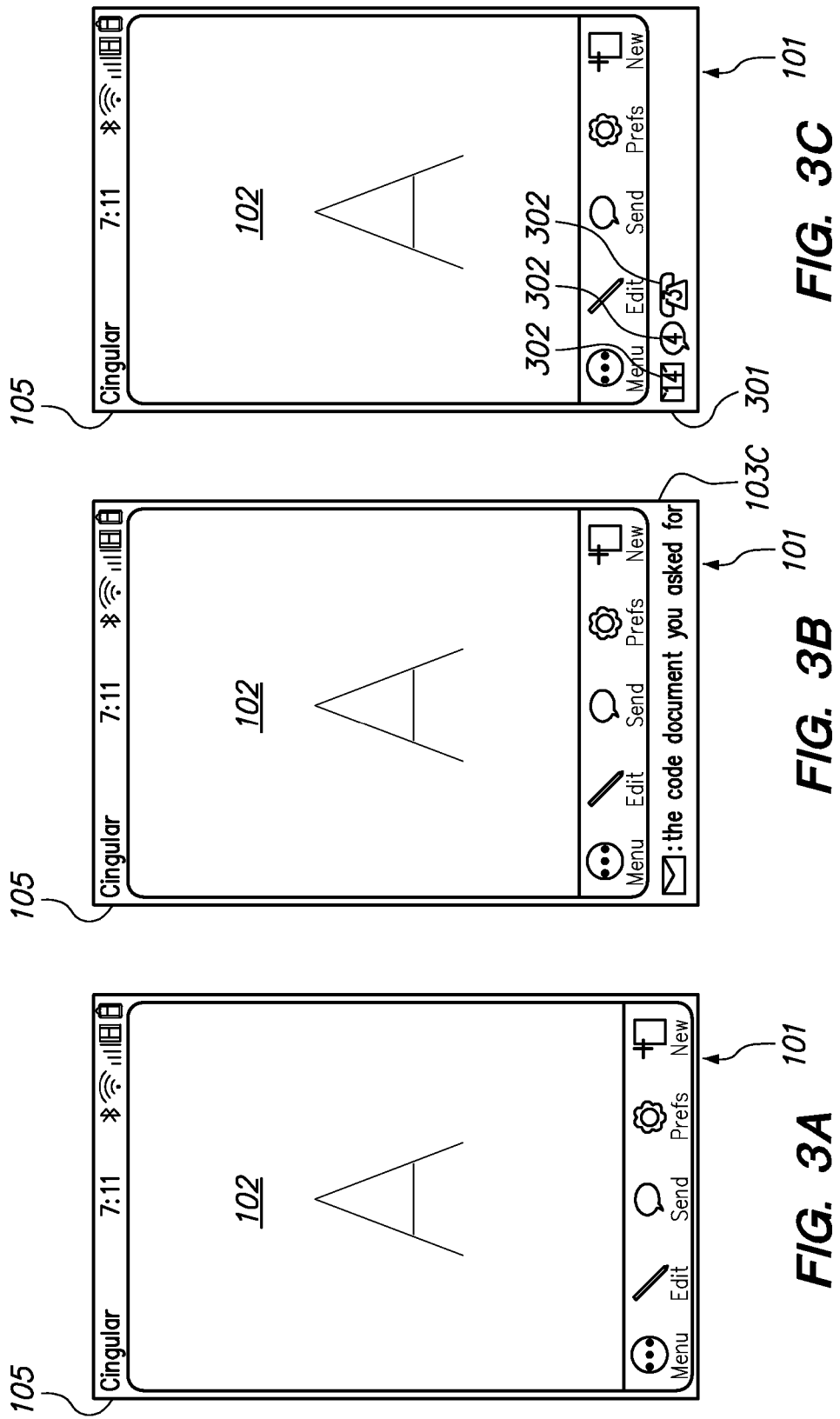

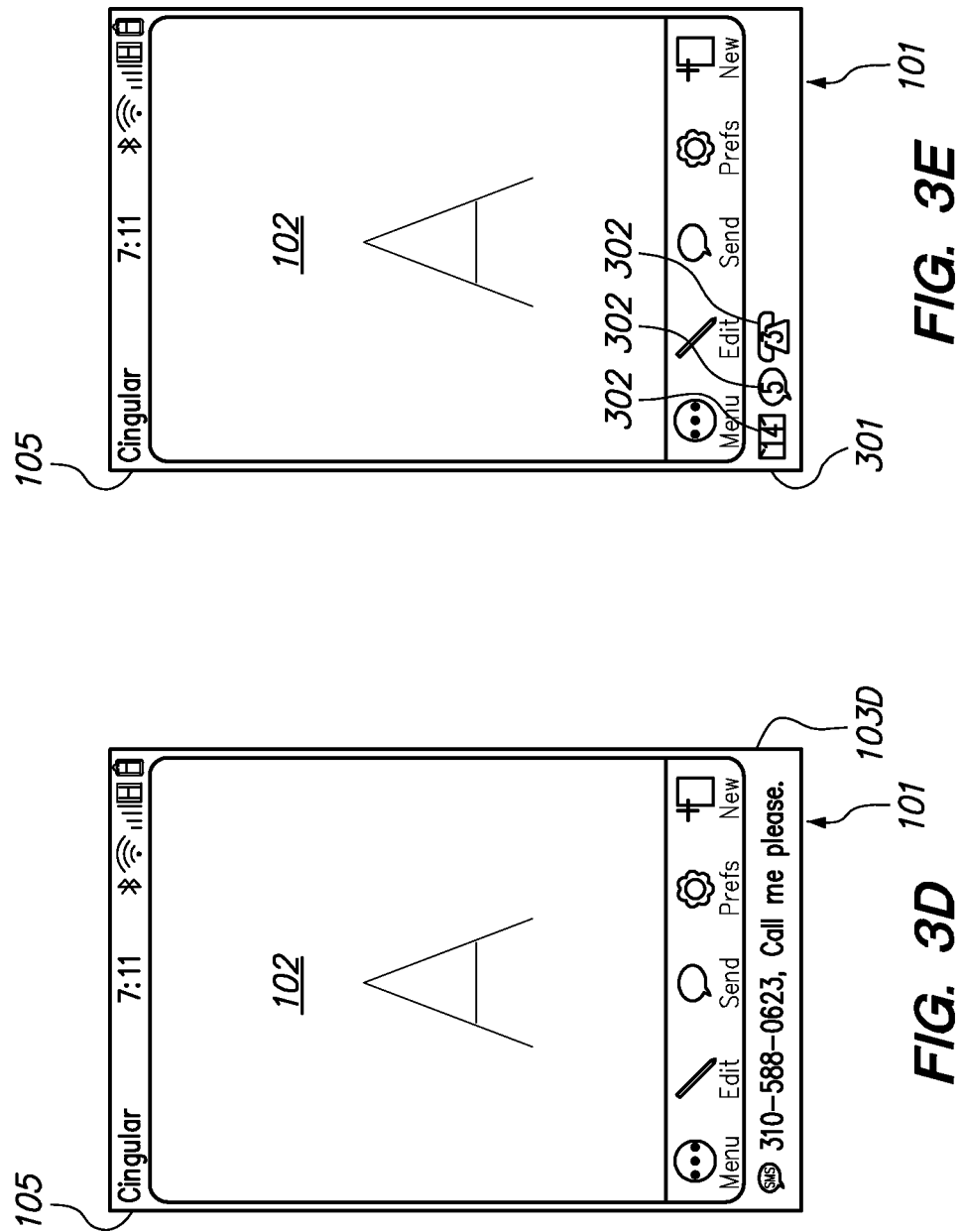

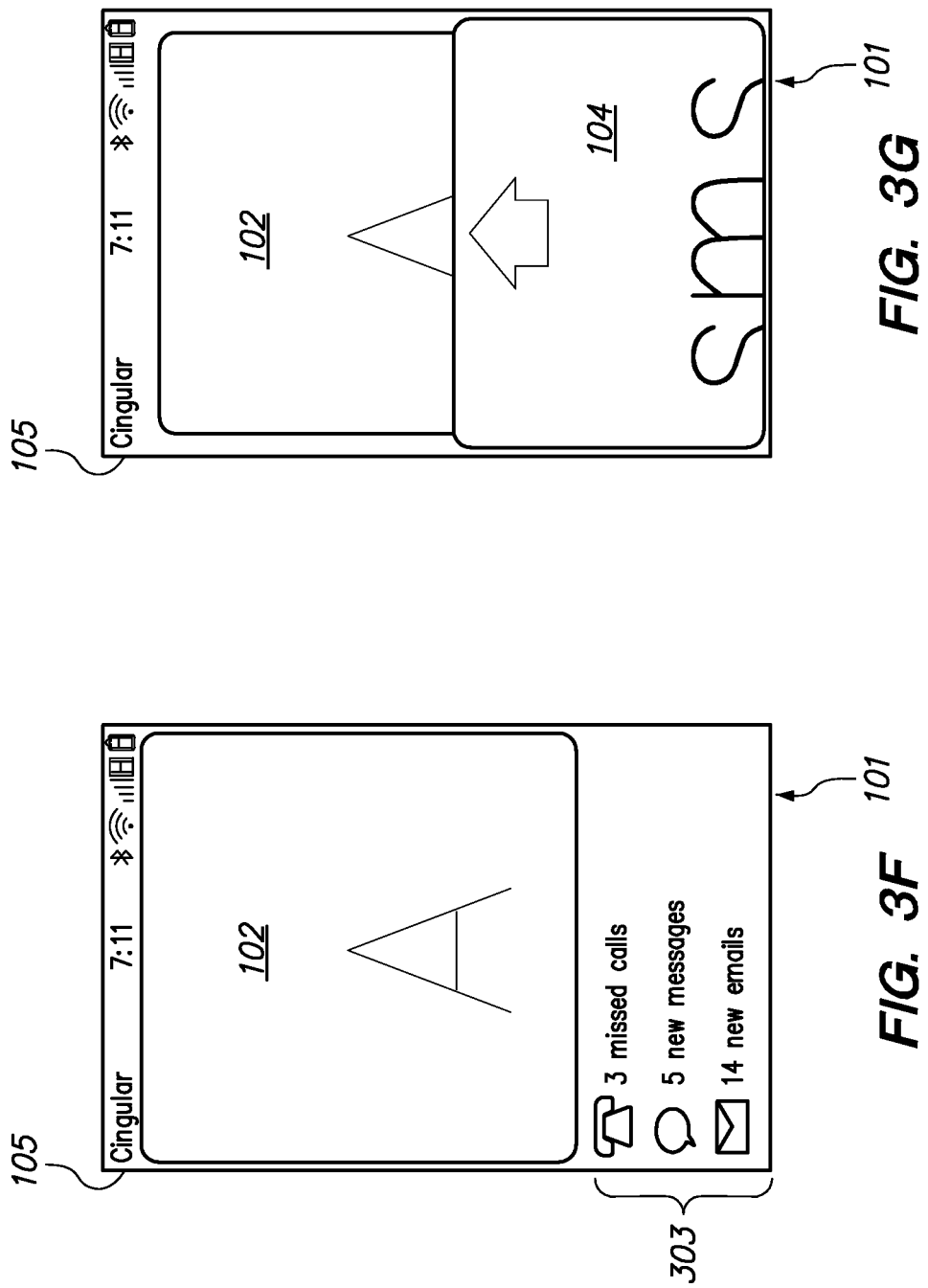

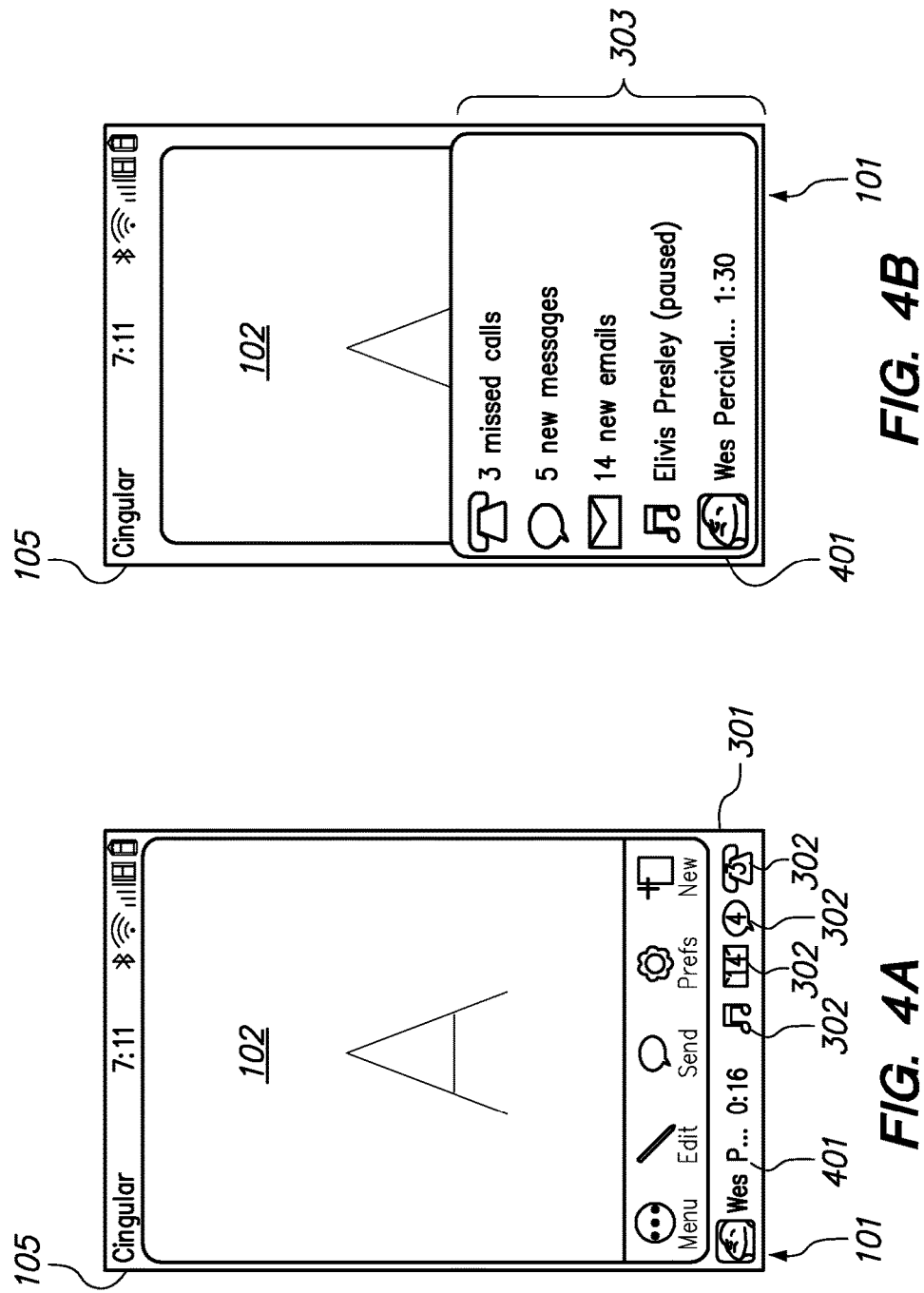

NOTIFYING A USER OF EVENTS IN A COMPUTING DEVICE

FIELD OF THE INVENTION

In various embodiments, the present invention relates to a user interface for a computing device, and more particularly to systems and methods for notifying a user of events in such a computing device.

DESCRIPTION OF THE RELATED ART

It is often necessary or useful to inform a user of an event that takes place while a user is using a computing device. Some events require immediate action, warranting interruption of whatever task the user is performing at the time the event occurs. An example is an incoming telephone call, or a low-power warning on a battery-powered computing device. Other events are less critical, so that the user may wish to be informed of the event without being interrupted in the task being performed. An example is receipt of an email message while the user is engaged in another task.

Conventional user interfaces provide several mechanisms for informing users of events. Often, such mechanisms include visual elements such as dialog boxes that appear on a display screen, obscuring or partially obscuring the document or other item the user is working on. Users often find such notifications intrusive and distracting. In addition, users often dismiss such notifications without paying them the appropriate level of attention, because the user is focused on some other task. Later, when the user wishes to revisit the notification so as to respond to it more appropriately, it is often difficult or impossible to do so, since the notification has already been dismissed.

Some user activities are interruptible upon receipt of an event notification. However, in many cases, a user may wish to easily resume the activity after he or she has reviewed the event notification and/or taken appropriate action. For example, if a user is on a telephone call when an event notification is presented, the user will generally want to resume the telephone call after viewing the event notification.

Devices having small screens, such as mobile devices including cellular telephones, handheld computers, personal digital assistants, smartphones, music players, and the like, often present particular problems in event notification. The limited screen sizes of such devices provide fewer options for visual notification of events. In addition, in such devices, the entire screen is often devoted to a single application, document, message, task, or activity, so as to make the most effective use of the extremely limited amount of space available. Accordingly, users of such devices are often subject to even more intrusive event notifications that tend to obscure a greater proportion of the display area being used for the task at hand. These event notifications can make it difficult for users to respond appropriately to the event, and can also make it difficult for users to return to the task they were performing before the event occurred. Accordingly, conventional event notifications often have an adverse effect on user productivity and diminish the quality of the user experience.

What is needed is a system and method for notifying a user of an event in a computing device in an unobtrusive way that minimizes task interruption and is effective for a device having a small screen. What is further needed is a system and method that provides different types of event notifications depending on the urgency with which the user must respond to the notification. What is further needed is a system and method that allows a user to easily continue performing a task after an event notification is received. What is further needed is a system and method that informs a user of an event, but allows the user to continue performing a task and to view the notification in more detail at a later time, if desired.

SUMMARY OF THE INVENTION

According to various embodiments of the present invention, a mechanism is provided for notifying a user of events in a computing device. Event notifications take the form of alerts that can be presented in different ways. The particular form of each event notification depends on the nature of the event, the user task being performed at the time the event occurs, the user's preferences, or any combination thereof. The systems and methods of the present invention, according to various embodiments, are particularly well suited to devices having small screens, as they minimize the obtrusiveness of event notifications on such screens. However, one skilled in the art will recognize that the systems and methods of the present invention, according to various embodiments, can be used for presenting event notifications in any electronic device having any type of visual display.

In one embodiment, the present invention presents event notifications in the form of banner alerts. Obtrusiveness is minimized by presenting the notification at a location near the edge of the screen (such as a bottom edge), and slightly shrinking the active display area to make room for the event notification. In this manner, event notifications can be presented without obscuring any part of the active display area. In addition, the user can obtain more information about the event by activating the notification (for example by tapping on it).

In another embodiment, the present invention provides pop-up notifications, such as dialog boxes, for more urgent events. Again, the active display area can be reduced in size to allow the user to directly interact with the event notification.

According to one embodiment, the event notifications of the present invention are unobtrusive and allow the user the continue working in the active display area while ignoring the notification, if desired.

In another embodiment, the present invention provides a summary of pending event notifications. Thus, if the user is unable to (or does not wish to) respond to or acknowledge a notification when it is presented, the user can later view the event notification summary at his or her convenience, and can act on the event notifications at that time.

In another aspect, certain notifications are automatically dismissed after some period of time. Other notifications may persist, but be relegated to a notification summary that can later be expanded by the user to view individual notifications at his or her convenience. The behavior of notifications can depend on user preferences, event type, current user activity, and/or any other factors.

Additional features and advantages will become apparent in the description provided below.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

FIGS. 1A through 1C depict an example of an event notification presented as a banner along the bottom edge of a display screen, according to one embodiment of the present invention.

FIGS. 2A through 2C depict an example of an event notification being dismissed upon expiration, and an example of an event notification being overwritten by a new notification, according to embodiments of the present invention.

FIGS. 3A through 3C depict an example of a persistent event notification and an expandable event notification summary, according to embodiments of the present invention.

FIGS. 3D through 3E depict an example of a transitory event notification being overwritten by an expandable event notification summary, according to an embodiment of the present invention.

FIG. 3F depicts an example of an event notification summary in an expanded state, according to an embodiment of the present invention.

FIG. 3G depicts an example of an application being invoked from an event notification summary, according to an embodiment of the present invention.

FIG. 4A depicts an example of an event notification summary including a high-priority pending event, according to an embodiment of the present invention.

FIG. 4B depicts an example of an expanded event notification summary including a high-priority pending event, according to an embodiment of the present invention.

DETAILED DESCRIPTION OF THE EMBODIMENTS

System Architecture

Figure 5:
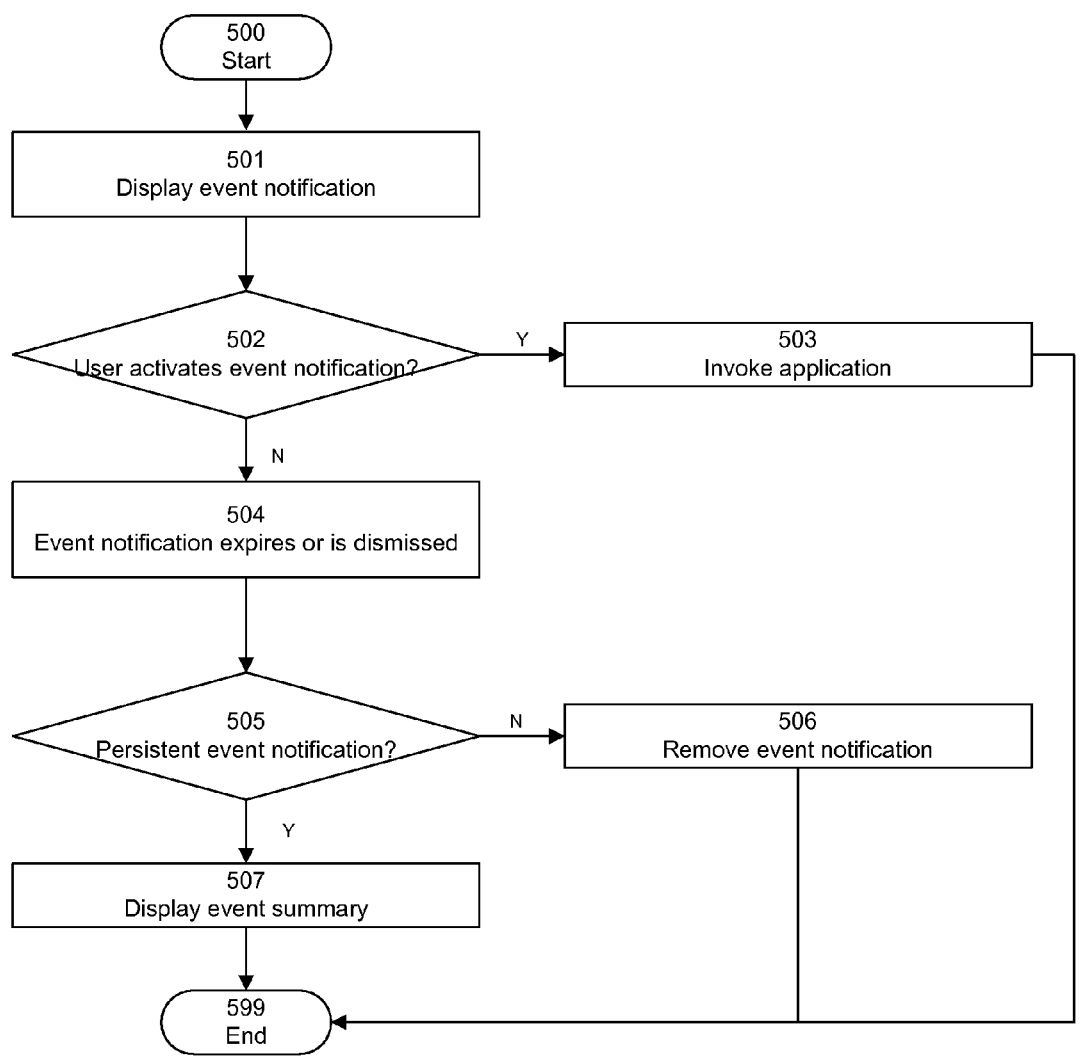
FIG. 5 depicts a flow diagram depicting a method for displaying and dismissing event notifications and/or event summaries according to one embodiment.

According to various embodiments, the present invention can be implemented on any electronic device, such as a handheld computer, personal digital assistant (PDA), personal computer, kiosk, cellular telephone, and the like. For example, in various embodiments, the invention can be implemented as a feature of a software application or operating system running on such a device. Accordingly, in various embodiments, the present invention can be implemented as part of a graphical user interface for controlling and interacting with software on such a device.

In various embodiments, the invention is particularly well-suited to devices such as smartphones, handheld computers, and PDAs, which have limited screen space and which are capable of running several software applications concurrently. One skilled in the art will recognize, however, that in other embodiments the invention can be practiced in other contexts, including any environment in which it is useful to provide event notifications to a user. Accordingly, the following description is intended to illustrate various embodiments of the invention by way of example, rather than to limit the scope of the claimed invention.

Referring now to FIGS. 1A through 1C, there is shown an example of an event notification 103 presented as a banner along the bottom edge of a display screen 101 of a device, according to one embodiment of the present invention.

In one embodiment, screen 101 is touch-sensitive, so that a user can interact with applications, notifications, and other items by touching various locations on screen 101. Touch-sensitive screen 101 can be implemented using any technology that is capable of detecting a location of contact. In another embodiment, a user can interact with on-screen items by way of a keyboard and/or pointing device such as a trackball, roller switch, stylus, touchpad, mouse, or the like. In one embodiment, the device on which screen 101 is presented also includes a touch-sensitive gesture area (not shown) for entering gesture-based commands.

Screen 101 may be a component of a personal digital assistant, smartphone, or any other electronic device. Such devices commonly have telephone, email, and text messaging capability, and may perform other functions including, for example, playing music and/or video, surfing the web, running productivity applications, and the like. In various embodiments, the present invention can be implemented in any type of electronic device having a display screen, and is not limited to devices having the listed functionality. In addition, the particular layout shown in the Figures is merely exemplary and is not intended to be restrictive of the scope of the claimed invention.

FIG. 1A depicts screen with an active display area 102 for an application occupying substantially the entire screen 101. Active display area 102 is blank in FIG. 1A; however, in actual use, active display area 102 would contain content and/or application elements relevant to the task at hand. One skilled in the art will recognize that, in various embodiments, the present invention can also be implemented in a multi-window context or other environment where display areas for more than one application are shown concurrently on screen 101. Status bar 105 is also shown, including information such as current time, battery strength, signal strength, enabled services, and the like; however, status bar 105 is not needed for the present invention.

FIG. 1B depicts screen 101 when an event has taken place. Event notification 103 is displayed along the bottom edge of screen 101. One skilled in the art will recognize that event notification 103 can be displayed 501 at any location on screen 101; however, showing event notification 103 along one of the edges of screen 101 is advantageous because it is relatively unobtrusive. Active display area 102 is slightly reduced in size by scaling its contents to make room for event notification 103. Thus, none of the content of display area 102 is obscured; rather, it is merely resized to provide room for event notification 103. In an alternative embodiment, active display area 102 is not resized, but a portion of area 102 is obscured by event notification 103. Event notification 103 can be made translucent, if desired, so that the obscured portion of display area 102 is still visible behind notification 103.

In the example of FIG. 1B, event notification 103 is an alert notifying the user of an incoming text message. Some or all of the text message can be displayed. One skilled in the art will recognize that event notification 103 can be of any type.

If the user activates event notification 103, for example by tapping on it, an application relevant to notification 103 is invoked. For example, FIG. 1C depicts a text messaging application 104 being invoked in response to a user tapping on event notification 103 of FIG. 1B that showed a text message. In one embodiment, invoking the application 104 causes the remaining portion of the text message (or other content) to be displayed. In addition, the application may provide the user with various options for interacting with, saving, deleting, flagging, and/or responding to the message.

FIG. 1C depicts application 104 in the midst of a transition where its window is being opened. In one embodiment, application 104 occupies the entire screen 101 once invoked. In another embodiment, application 104 occupies a portion of screen 101, while the remaining portion of screen 101 is still occupied by area 102.

As shown in FIG. 1C, event notification 103 is dismissed when application 104 is invoked. In another embodiment, event notification 103 may remain on screen 101 even after application 104 is invoked.

Referring now to FIGS. 2A and 2B, there is shown an example of an event notification 103A being dismissed upon expiration. In FIG. 2A an event notification 103A is shown, alerting the user that the battery is at 30%. As before, display area 102 and its contents are reduced in size to allow for the display of event notification 103A. In one embodiment, after some time period has elapsed since event notification 103A is displayed, event notification 103A is automatically dismissed. Display area 102 and its contents return to their original sizes.

Referring now to FIGS. 2A and 2C, there is shown an example of an event notification 103A being replaced by a new event notification 103C. For example, if event notification 103A is being displayed, as in FIG. 2A, when another event takes place, a new event notification 103B, as shown in FIG. 2C, may replace the previously displayed event notification 103A.

In one embodiment, some event notifications are prioritized with respect to other event notifications. Thus, if an event notification 103 is being displayed when a higher-priority event takes place, the new event notification 103 may replace the previous event notification 103. But if an event notification 103 is being displayed when a lower-priority event takes place, the new event notification 103 may be handled differently: it may not be displayed at all, or its display may be postponed until the first event notification 103 is dismissed by the user or otherwise disposed of, or the two event notifications 103 may be displayed concurrently. Alternatively, an event notification summary may be shown, as described in more detail below. In one embodiment, the relative priorities of the events can be configured by a system administrator and/or by the originator of the event. The specific handling of overlapping event notifications can be configured by a system administrator and/or by the user. Thus, for example, some event notifications can be configured to expire after some period of time, while others may be configured to be persistent so that they continue to be displayed until dismissed by the user. In addition, some event notifications can be configured to be replaced if a newer event notification is to be presented, while other event notifications can be configured to be postponed if a previous event notification is being displayed.

Referring now to FIGS. 3A through 3C, there is shown an example of a persistent event notification 103C and an expandable event notification summary 301, according to embodiments of the present invention. FIG. 3A shows an initial state, where display area 102 occupies substantially the entire display screen 101. In FIG. 3B, event notification 103C is displayed; as described above, display area 102 can optionally be reduced in size to make room for notification 103C. In the example of FIG. 3B, event notification 103C represents an incoming email message.

In some embodiments, some event notifications, such as 103C, are persistent. These may represent events that the user would not want to miss, such as for example an incoming email message. Thus, in one embodiment, when a persistent event notification 103C expires, or when a new event notification is to be displayed while a persistent event notification 103C is being displayed, an event summary 301 is displayed. Event summary 301 includes a series of icons 302 indicating event notifications 103 that have been received and/or presented. In one embodiment, event summary 301 provides abbreviated information concerning the events that have taken place, so as to occupy minimal space on display 101. For example, as shown in FIG. 3C, event summary 301 may contain an icon 302 for each type of event that has occurred, wherein each icon 302 is superimposed by a numeric indicator of the number of pending events of that type. In the example, icons 302 indicate that fourteen incoming email messages, five text messages, and three missed telephone calls have been received. One skilled in the art will recognize that event summary 301 can take many other forms.

Event summary 301 thus provides a mechanism for informing the user of a number of important events that have taken place, even if the user is not able to (or chooses not to) respond or dispose of each event notification 103 as it is individually presented.

In one embodiment, if a new event takes place while event summary 301 is being displayed, the new event notification may overwrite event summary 301. Referring now to FIG. 3D, there is shown an example of new event notification 103D that overwrites previously displayed even summary 301. Once event notification 103D expires or is disposed of by the user, event summary 301 is again displayed, as shown in FIG. 3E. Note that in event summary 301 of FIG. 3E, the number of incoming text messages has been incremented from 3 to 4, to indicate the additional new text message of event notification 103D.

In one embodiment, event summary 301 is expandable. The user can tap (or otherwise activate) event summary 301 to cause it to expand. Referring now to FIG. 3F, there is shown an expanded version 303 of event summary 301. In one embodiment, the expanded version 303 obscures part of display area 102. In another embodiment, display area 102 is further reduced in size to make room for the expanded version 303 of event summary 301.

The expanded version 303 explicitly indicates the number of events of each type. The user can tap on any item in the expanded version 303 to invoke the corresponding application. Referring now to FIG. 3G, there is shown an example of a text application 104 being invoked in response to the user tapping on the portion of the expanded version 303 that refers to text messages. As with the example shown in FIG. 1C, application 104 is shown in the midst of a transition where its window is being opened. In one embodiment, application 104 occupies the entire screen 101 once invoked. In another embodiment, application 104 occupies a portion of screen 101, while the remaining portion of screen 101 is still occupied by area 102.

In one embodiment, the user can dismiss the expanded version 303 of event summary 301 to return to the normal view as shown in FIG. 3E. In one embodiment, the expanded version 303 is automatically dismissed after some period of time, so that display 303 reverts to the normal view as shown in FIG. 3E.

In one embodiment, a highest-priority event is shown more prominently within event summary 301 than other events. For example, an ongoing telephone call may be such an event, and is therefore given more space within event summary 301 than other events. Referring now to FIG. 4A, there is shown example of an event notification summary 301 including a high-priority pending event 401, according to an embodiment of the present invention. Event 401 is an ongoing telephone call, and therefore warrants a more detailed display than the remaining items which are shown as icons 302 in summary 301. Accordingly, event 401 is shown with a more complete description. Remaining icons 302 represent a paused song, and indicators of the number of email messages received, text messages received, and telephone calls received. Since there is insufficient space to show the full name of the party on the telephone call, an ellipsis is used as part of event 401.

FIG. 4B depicts an expanded version 303 of the event summary 301 shown in FIG. 4A, including a more complete depiction of high-priority pending event 401.

In one embodiment, high-priority event notifications are directly manipulable by the user. For example, if a telephone call is received while the user is working on a task within display area 102, event notification 103 is shown. The user can ignore event notification 103 and continue working in display area 102; if so, event notification 103 will eventually be dismissed or relegated to event summary 301. An ignore button (not shown) can optionally be provided to allow the user to indicate that he or she is not interesting in taking the telephone call. Alternatively, the user can answer the telephone call, for example by tapping on event notification 103. The telephone application is then invoked, taking over entire screen 101 or some portion thereof to allow easier interaction therewith. During the telephone call, the user can minimize the telephone application, so that the telephone call event is shown as an event notification 103 or as part of an event summary 301 (depending on whether other events are also pending).

In one embodiment, the user can also dismiss an event, for example to end a telephone call, by swiping the corresponding event notification 103 off the screen 101.

In one embodiment, events are shown on a secondary screen or a portion of a secondary screen. Thus, in a device having two or more display screens, the system of the present invention can in one embodiment reconfigure a display area of any of the display screens in order to make room for display of an event or event summary as described herein. This is particularly useful in devices having a primary and an auxiliary display screen. The selection of which screen to use for display of an event can be made automatically based on current status of the display screens, importance of the event, other currently displayed events and status messages, and the like.

Referring now to FIGS. 5 through 8, there are shown flow diagram depicting methods for practicing the present invention according to one embodiment.

FIG. 5 depicts a method for displaying and dismissing event notifications and/or event summaries according to one embodiment. An event notification 103 is displayed 501, as depicted in FIG. 1B. As described above, active display area 102 may be reduced in size slightly to provide room for event notification 103. If the user activates 502 the event notification 103, the corresponding application is invoked 503, as depicted in FIG. 1C. If event notification 103 expires or is dismissed 504, a determination is made 505 as to whether event notification 103 is persistent. If it is not persistent, it is removed 506 from the screen, as depicted in FIG. 2B. If it is persistent, an event summary 301 is displayed 507, as depicted in FIG. 3C.

Figure 6:
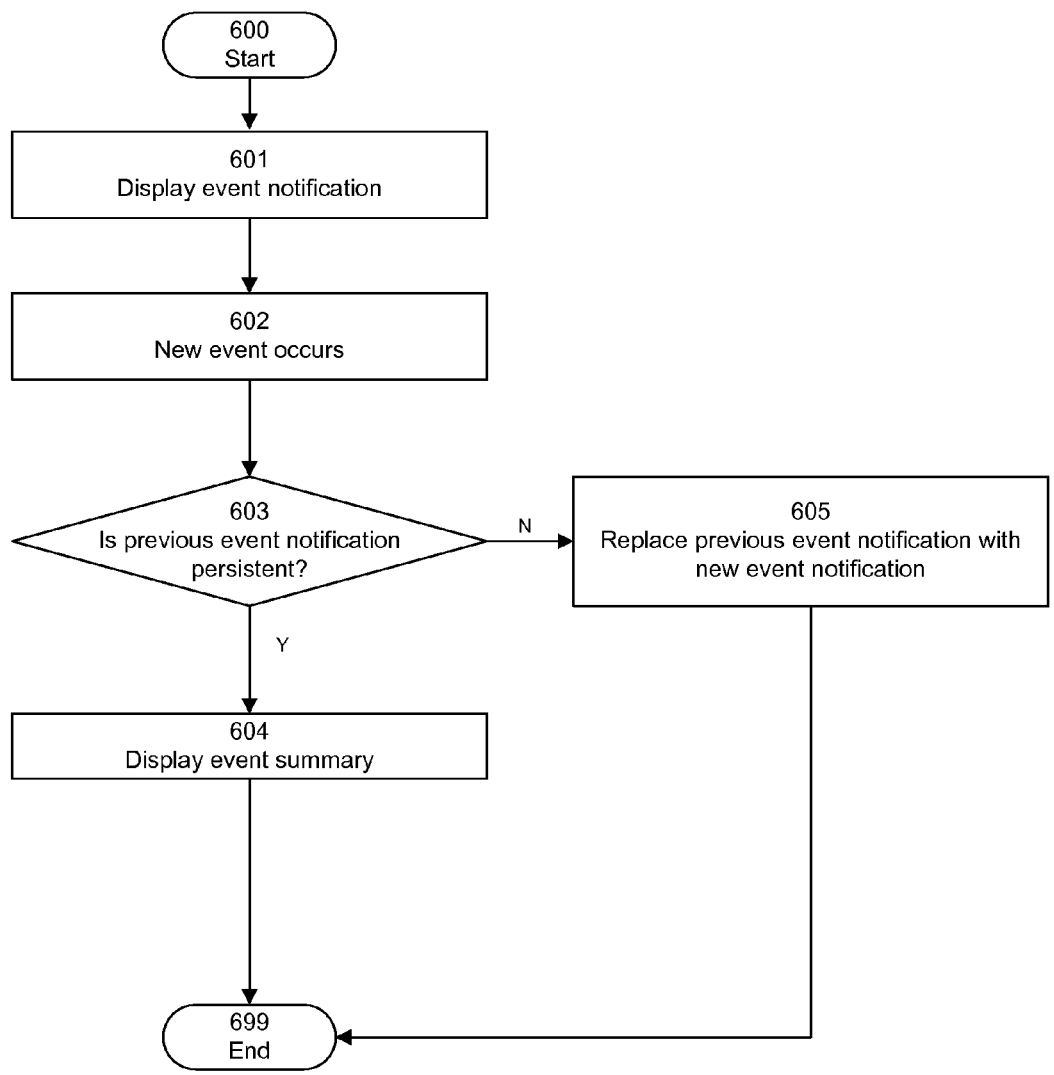
FIG. 6 depicts a method for displaying a new event notification when a previous event notification is being displayed, according to one embodiment.

FIG. 6 depicts a method for displaying a new event notification 103B when a previous event notification 103A is being displayed, according to one embodiment. An event notification 103A is displayed 601, as depicted in FIG. 2A. A new event occurs 602. A determination is made 603 as to whether the displayed notification 103A is persistent. If not, the new event notification 103B replaces 605 the previous event notification 103A, as depicted in FIG. 2C.

If, in 603, the displayed event notification 103A is persistent, and if no user action has been taken on the displayed event notification 103A, the event summary 301 is displayed 604, as depicted in FIG. 3C.

Figure 9:
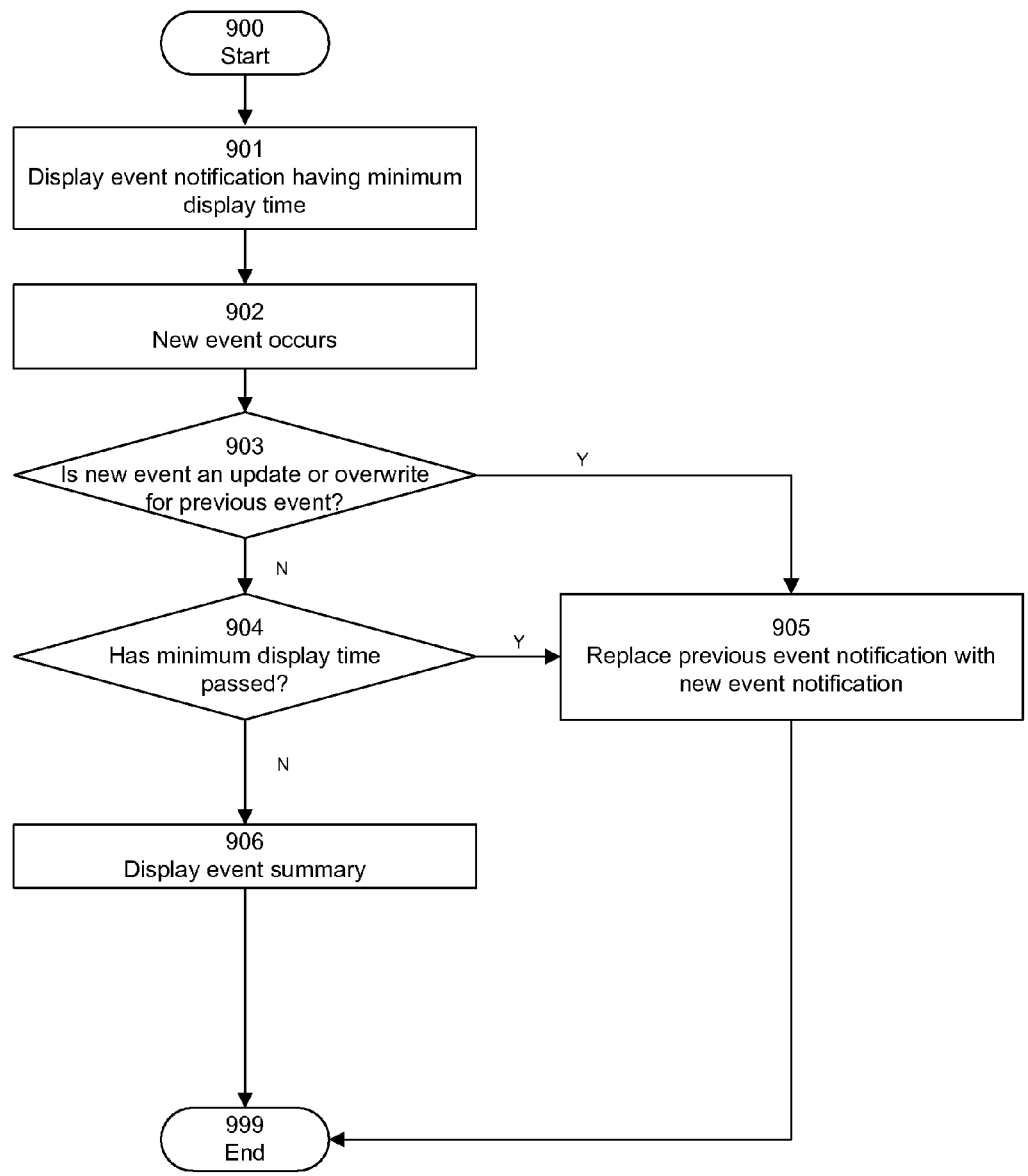
FIG. 9 depicts a method for displaying a new event notification when a previous event notification having a minimum display time is being displayed, according to one embodiment.

FIG. 9 depicts a method for displaying a new event notification when a previous event notification having a minimum display time is being displayed, according to one embodiment. In this embodiment, the new event notification 103B does not replace the previous event notification 103A until the previous event notification 103A has been displayed for a specified minimum time period. The minimum time period can be a predetermined global parameter, or it may be specific to the event notification 103A. In one embodiment, the event notification 103A is displayed for at least the minimum time period, but may be displayed longer if no subsequent event notifications 103B are ready for display. In one embodiment, a user can dismiss the event notification 103A prior to expiry of the time period, in which case a new event notification 103B can be displayed subsequent to the dismissal.

In one embodiment, an exception is made if the subsequent event notification 103B is from the same applet or application and overwrites or updates the information contained in the previous event notification 103A. In such a case, the subsequent event notification 103B can replace the previous event notification 103A without waiting the minimum time period. For example, a message saying "You have 3 new messages" can be replaced by a message saying "You have 4 new messages" without waiting the minimum time period.

Thus, as shown in FIG. 9, an event notification 103A is displayed 901. A new event occurs 902. A determination is made 903 as to whether the new event is an update or overwrite for the previous event. If so, the new event notification 103B replaces 905 the previous event notification 103A. If the new event is not an update or overwrite, a determination is made 904 as to whether the minimum display time for the event notification 103A has passed. If so, the new event notification 103B replaces 905 the previous event notification 103A.

If the new event is not an update or overwrite for the previous event, and if the minimum display time for the event notification 103A has not passed, an event summary 301 is displayed 906.

Figure 7:
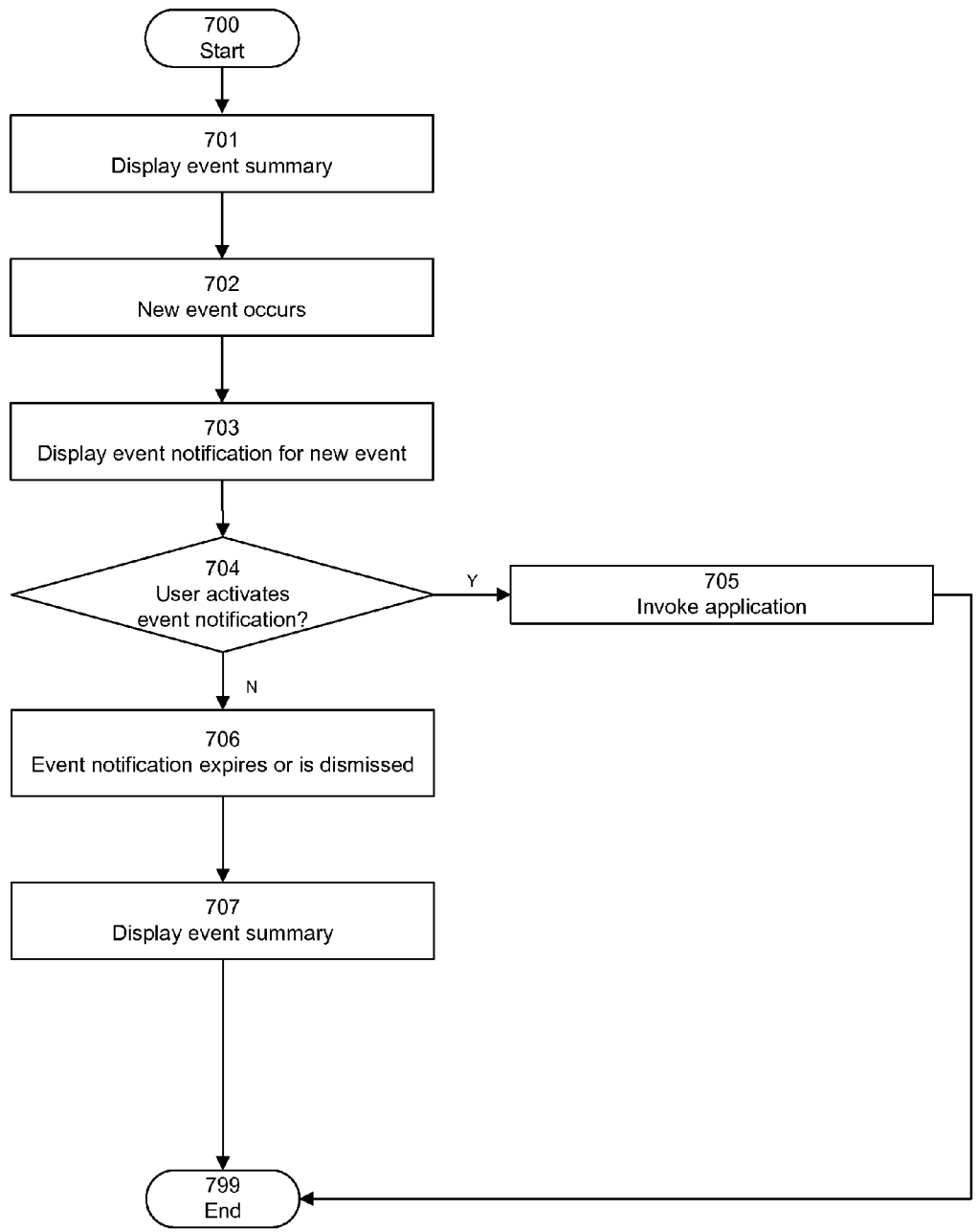
FIG. 7 depicts a method for displaying a new event notification when an event summary is being displayed, according to one embodiment.

FIG. 7 depicts a method for displaying a new event notification 103D when an event summary 301 is being displayed, according to one embodiment. Event summary 301 is displayed 701, as depicted in FIG. 3C. A new event occurs 702. An event notification 103D is displayed 703 for the new event, as depicted in FIG. 3D. If the user activates 704 the event notification 103D, the corresponding application is invoked 705. If the user does not activate the event notification 103D, once the event notification 103D expires or is dismissed 706, event summary 301 is again displayed 707, as depicted in FIG. 3E. Event summary 301 now incorporates information for the new event.

Figure 8:
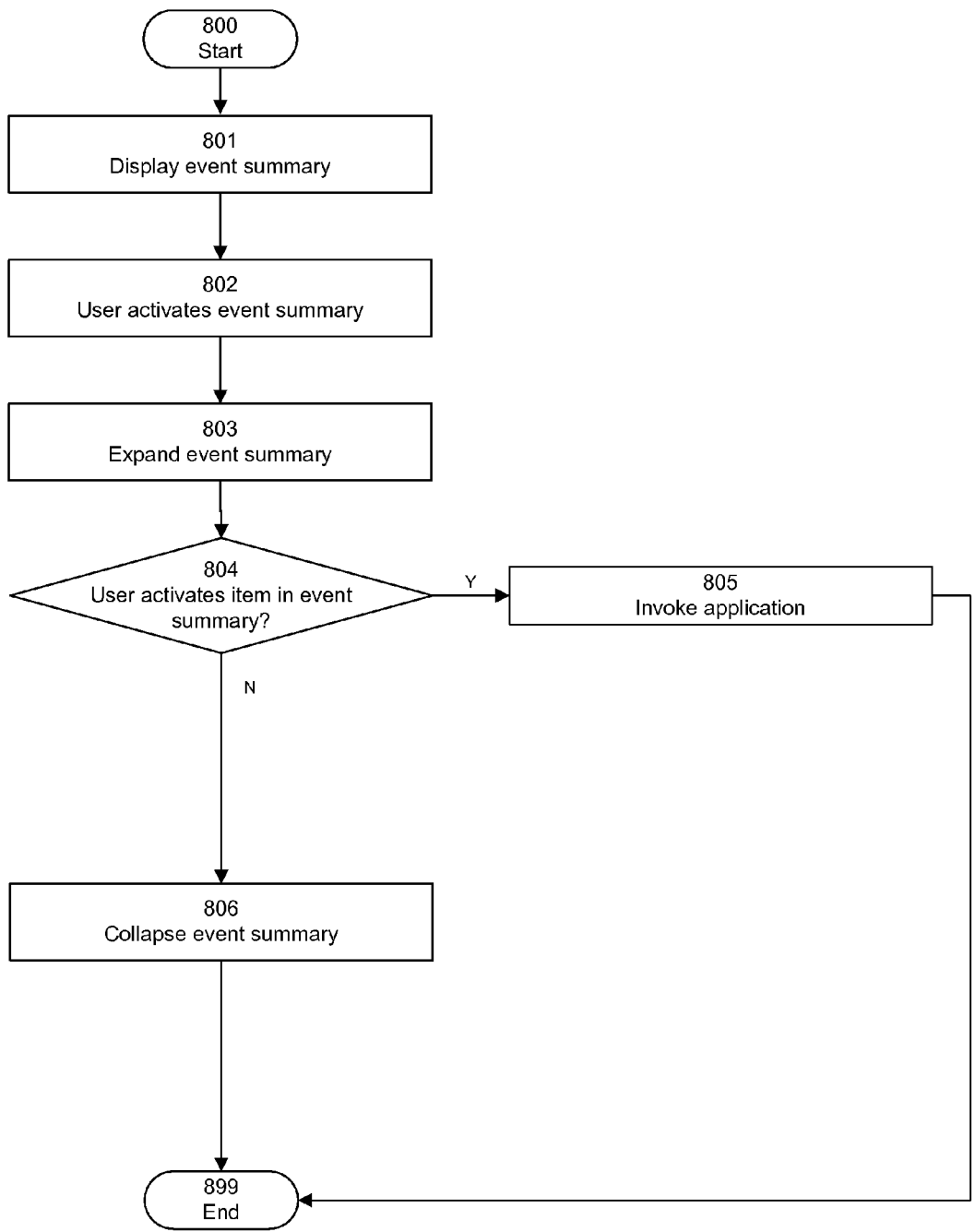
FIG. 8 depicts a method for activating an item in an event summary according to one embodiment.

FIG. 8 depicts a method for activating an item in an event summary according to one embodiment. An event summary 301 is displayed 801, as depicted in FIG. 3E. The user activates 802 event summary 301. Event summary 301 is expanded 803, to show expanded version 303 as depicted in FIG. 3F. If the user activates 804 an item in expanded event summary 303, the corresponding application 104 is invoked 805, as depicted in FIG. 3G. If the user does not activate an item in expanded event summary 303, event summary collapses 806, for example after some period of time (or after the user enters a command to collapse it), to its original state as depicted in FIG. 3E.

In one embodiment, the present invention can be used to allow a user to monitor status of a persistent set of data that is of interest. Thus, while the user is engaged in some activity on a device, he or she can use the techniques of the present invention according to various embodiments to monitor status of some set of data, such as an inbox, battery life, signal strength, or the like. Updates to the data can be presented according to the techniques of the present invention.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Further, the computers referred to herein may include a single processor or may be architectures employing multiple processor designs for increased computing capability.

The algorithms and displays presented herein are not inherently related to any particular computer, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A method performed by one or more processors of a mobile computing device, comprising:
presenting, along a first edge of a touch-sensitive display of the mobile computing device, a status bar indicating at least one of a time, a remaining battery strength, and a signal strength;
detecting an event comprising reception of a text message or an email by the mobile computing device;
presenting a banner alert, along an edge of the touch-sensitive display and separate from the status bar, indicating the detected event;
in response to a user tapping on the banner alert rather than swiping the banner alert off the touch-sensitive display, invoking an application that displays the text message or email corresponding to the detected event;
in response to the user swiping the banner alert off the touch-sensitive display rather than tapping on the banner alert, dismissing the banner alert from the touch-sensitive display without invoking the corresponding application;
in response to the banner alert being dismissed, relegating the banner alert to an event summary; and
presenting the event summary on the touch-sensitive display, wherein the event summary is separate from the status bar and includes at least one of a first icon indicating a number of missed text messages and a second icon indicating a number of missed emails.

2. The method of claim 1, wherein the invoked application is displayed only in a portion of the touch-sensitive display.

3. The method of claim 1, further comprising:
automatically dismissing the banner alert from the touch-sensitive display after a period of time.

4. The method of claim 1, wherein the event summary further comprises:
a third icon indicating a number of missed telephone calls.

5. The method of claim 1, further comprising:
detecting another event; and
presenting, on the touch-sensitive display, a notification indicating the detected other event.

6. The method of claim 5, wherein the notification comprises a pop-up notification including a dialog box.

7. The method of claim 6, wherein the pop-up notification and the banner alert are presented on the touch-sensitive display in different forms.

8. The method of claim 5, further comprising:
presenting the notification as either a banner alert or a pop-up notification based on a user preference.

9. The method of claim 1, wherein:
in response to the detected event, the banner alert is presented over at least a portion of the display area.

10. The method of claim 9, wherein the status bar is outside of the display area.

11. The method of claim 1, further comprising:
dismissing the banner alert from the touch-sensitive display in response to the user invoking the application.

12. The method of claim 1, further comprising:
detecting another event by the mobile computing device; and
replacing the banner alert with a notification indicating the detected other event based on the other event having a higher priority than the event associated with the banner alert.

13. The method of claim 1, wherein the detected event is reception of the text message, and the invoked application is a text messaging application for responding to the received text message.

14. The method of claim 13, wherein dismissing the banner alert indicating reception of the text message does not invoke the text messaging application.

15. A mobile computing device, comprising:
a touch-sensitive display;
one or more processors; and
a memory storing instructions that, when executed by the one or more processors, cause the mobile computing device to:
present, along a first edge of a touch-sensitive display of the mobile computing device, a status bar indicating at least one of a time, a remaining battery strength, and a signal strength;
detect an event comprising reception of a text message or an email by the mobile computing device;
present a banner alert, along an edge of the touch-sensitive display and separate from the status bar, indicating the detected event;
in response to a user tapping on the banner alert rather than swiping the banner alert off the touch-sensitive display, invoke an application that displays the text message or email corresponding to the detected event;
in response to the user swiping the banner alert off the touch-sensitive display rather than tapping on the banner alert, dismiss the banner alert from the touch-sensitive display without invoking the corresponding application;
in response to the banner alert being dismissed, relegate the banner alert to an event summary; and
present the event summary on the touch-sensitive display, wherein the event summary is separate from the status bar and includes at least one of a first icon indicating a number of missed text messages and a second icon indicating a number of missed emails.

16. The mobile computing device of claim 15, wherein the invoked application is displayed only in a portion of the touch-sensitive display.

17. The mobile computing device of claim 15, wherein execution of the instructions causes the mobile computing device to further:
automatically dismiss the banner alert from the touch-sensitive display after a period of time.

18. The mobile computing device of claim 15, wherein the event summary further comprises:
a third icon indicating a number of missed telephone calls.

19. The mobile computing device of claim 15, wherein execution of the instructions causes the mobile computing device to further:
detect another event; and
present, on the touch-sensitive display, a notification indicating the detected other event.

20. The mobile computing device of claim 19, wherein the notification comprises a pop-up notification including a dialog box.

21. The mobile computing device of claim 20, wherein the pop-up notification and the banner alert are presented on the touch-sensitive display in different forms.

22. The mobile computing device of claim 19, wherein execution of the instructions causes the mobile computing device to further:
present the notification as either a banner alert or a pop-up notification based on a user preference.

23. The mobile computing device of claim 15, wherein:
in response to the detected event, the banner alert is presented over at least a portion of the display area.

24. The mobile computing device of claim 23, wherein the status bar is outside of the display area.

25. The mobile computing device of claim 15, wherein execution of the instructions causes the mobile computing device to further:
dismiss the banner alert from the touch-sensitive display in response to the user invoking the application.

26. The mobile computing device of claim 15, wherein execution of the instructions causes the mobile computing device to further:
detect another event by the mobile computing device; and
replace the banner alert with a notification indicating the detected other event based on the other event having a higher priority than the event associated with the banner alert.

27. The mobile computing device of claim 15, wherein the detected event is reception of the text message, and the invoked application is a text messaging application for responding to the received text message.

28. The mobile computing device of claim 27, wherein dismissing the banner alert indicating reception of the text message does not invoke the text messaging application.

* * * * *